(12) United States Patent
Villaret

(10) Patent No.: US 6,847,532 B2
(45) Date of Patent: Jan. 25, 2005

(54) SYSTEM AND METHOD TO ELIMINATE THE DEAD TIME INFLUENCE IN A PWM-DRIVEN SYSTEM

(75) Inventor: Yves Villaret, Hadera (IL)

(73) Assignee: Yaskawa Eshed Technology Ltd., Rosh Ha'ayin (IL)

( * ) Notice: Subject to any disclaimer, the term of this patent is extended or adjusted under 35 U.S.C. 154(b) by 41 days.

(21) Appl. No.: 10/416,735

(22) PCT Filed: Nov. 14, 2001

(86) PCT No.: PCT/IL01/01056

§ 371 (c)(1),
(2), (4) Date: May 14, 2003

(87) PCT Pub. No.: WO02/41085

PCT Pub. Date: May 23, 2002

(65) Prior Publication Data

US 2004/0027760 A1 Feb. 12, 2004

Related U.S. Application Data

(60) Provisional application No. 60/247,936, filed on Nov. 14, 2000.

(51) Int. Cl.[7] .......................... H02M 7/5387; H02H 3/00
(52) U.S. Cl. ......................................... 363/132; 361/94
(58) Field of Search ............................ 363/95, 97, 131, 363/132; 361/94, 100; 318/445, 756, 810; 327/108, 113, 392, 394, 399

(56) References Cited

U.S. PATENT DOCUMENTS

| | | | | | |
|---|---|---|---|---|---|
| 4,972,130 | A | * | 11/1990 | Rossi et al. | 318/293 |
| 5,719,521 | A | * | 2/1998 | Wong | 327/434 |
| 6,473,320 | B2 | * | 10/2002 | Randazzo | 363/56.02 |
| 6,486,714 | B2 | * | 11/2002 | Ushida et al. | 327/108 |
| 6,556,053 | B2 | * | 4/2003 | Stanley | 327/108 |

* cited by examiner

*Primary Examiner*—Matthew V. Nguyen
(74) *Attorney, Agent, or Firm*—Edward Langer; Shiboleth, Yisraeli, Roberts, Zisman & Co.

(57) ABSTRACT

A system and method to eliminate the influence of Dead Time delay in a PWM driven system. The system is implemented using a switching control circuit to operate a pair of upper and lower switching devices in a standard half-bridge arrangement, wherein both a PWM pulse train input and the direction of current flow (current command direction) are both utilized to operate the switching devices. Depending on the direction of the current command, the PWN pulse train input is directly applied to control one of the switching devices (the first switching device), while the second switching device is kept open at least during the closing time of the first switching device. Thus, a precise average PWM output volgate can be obtained, independent of the Dead Time delay, so that a large Dead Time can be used, to provide a precise voltage output over the full range of the DC power supply, while maintaining high reliability. The system can also be implemented using a microprocessor-based control system, for control of the switching devices, for betetr integration in a digital system.

15 Claims, 8 Drawing Sheets

Fig 4 - Current Command Cc ≥ 0

Fig 5 - Current Command Cc < 0

SYSTEM AND METHOD TO ELIMINATE THE DEAD TIME INFLUENCE IN A PWM-DRIVEN SYSTEM

This application claims the benefit of Provisional Application No. 60/247,936, filed Nov. 14, 2000.

FIELD OF THE INVENTION

The present invention relates to PWM motor control systems, and more particularly, to a motor control system and more generally, to an inductive load voltage controller.

BACKGROUND OF THE INVENTION

The power output to Inductive loads such as Motors is commonly applied by using the well-known technique of Pulse Width Modulation (PWM). This technique is well explained in chapter 5 of the text "Power Electronics", by Joseph Vithayathil, McGraw Hill Series in Electrical and Computer Engineering.

In a system using the PWM technique, voltage is applied to one or several points of the load by means of two switching devices such as transistors, or more precisely IGBTs (Insulated Gate Bipolar Transistors), in a bridge arrangement. One Switching device is connected from the positive pole of the power supply to the load, and the other one from the negative pole of the same power supply to the same load connection.

An inherent problem related to the PWM technique, is the introduction of a so-called Dead Time delay. This delay is introduced between the opening of one switch and the closing of the other switch. Such a delay is commonly introduced in order to avoid the possibility that the two switches will be activated together. Should both switches be activated together, then the power supply would be shorted and the high current would cause the destruction of the switches or of the power supply. Also, the switching time of the switching devices has some finite value, and that value may vary under different conditions, like temperature, load current, etc. Therefore, the Dead Time delay should have a higher value than the maximum switching time delay.

During the Dead Time delay, both switches are non-conducting. As a result, the voltage set on the load connection depends on the load condition, and in particular on the load current direction. If the current is positive (flowing toward the load), then it will be flowing through the lower leg bridge diode, and the voltage will be almost equal to that of the negative pole of the power supply. If the current is negative (flowing from the load to the switches), then the current will be flowing through the upper leg bridge diode, and the voltage will be almost equal to that of the positive pole of the power supply. This situation creates a non-deterministic relation between PWM duty cycle and voltage applied, and large imprecision in voltage output is observed.

Another problem created by the Dead Time delay is that voltages having a pulse width smaller than the Dead Time, cannot be output. Thus a voltage value close to Negative or Positive Power supply line voltage, which have respectively, a small on-time or a small off-time pulse width, cannot be output, thus creating a discontinuity in the voltage close to the negative or positive power supply voltage output.

When designing a PWM system, the engineer must make a difficult evaluation of the Dead Time influence. Too short a Dead Time delay will reduce the reliability of the system, i.e. under some conditions a short circuit can be obtained, while too long a Dead Time delay will spoil the system performance.

Switching schemes have been described in prior art patents which compensate for the voltage imprecision, however they do not resolve the discontinuity of average voltage output when the desired output voltage is near zero or near the DC power supply voltage. In U.S. Pat. No. 5,930,132 to Watanabe et al., an electronic system is shown with the purpose of minimizing the dead time delay. In this patent, the dead time delay is not eliminated, but only minimized. In U.S. Pat. No. 5,859,770 to Takada et al., an electronic arrangement is used that comprises a P channel transistor in order to reduce to almost zero the dead time. P channel transistors have the disadvantage of being limited in their power rating, so that in most modern systems only N channel IGBT's are used at high power. Thus the Takada et al. patent is not advantageous for medium and high power systems.

Therefore, it would be desirable to provide a system in which the Dead Time delay will not influence the precision of the system, which is applicable for the Power switching transistors commonly used today.

SUMMARY OF THE INVENTION

Accordingly, it is a principal object of the present invention to overcome the problems associated with Dead Time delays.

The present invention provides a system and method to resolve the Dead Time delay problem. The Dead Time influence is canceled, i.e. the precise value of the voltage output is not dependent on the dead time value; furthermore, the whole range of voltage output values of the DC power supply is made available, in a continuous way.

In accordance with a preferred embodiment of the present invention, there is provided a system for producing an output voltage for supplying current to a load, by controlling the switching of a pair of electronic switches in order to eliminate the influence of dead time between switching them, the pair of electronic switches being connectable in a half-bridge arrangement across power supply terminals, with the first switch being connected to a positive power supply terminal, wherein a positive current flow direction is defined with respect to the load, when current flows to the load, the system comprising:

first means operable to close and open the first switch of the electronic switch pair in response, respectively, to the ON and OFF times of an input signal waveform;

second means operable to open and close the second switch of the electronic switch pair in response, respectively, to the ON and OFF times of the input signal waveform;

such that in the case where a positive current command is provided to establish a positive current, the first means closes the first switch during the ON time of the input signal waveform, and opens it during the OFF time thereof while the second means operates to open the second switch at least during the closing time of the first switch, and in the case where a negative current command is provided to establish a negative current, the second means opens the second switch during the ON time of the input signal waveform, and closes it during the OFF time thereof, while the first means operates to open the first switch at least during the closing time of the second switch, the first and second electronic switches operating such that the average output voltage will be precisely in accordance with the average width of the input signal waveform.

The system is implemented using a switching control circuit to operate a pair of upper and lower switching devices in a standard half-bridge arrangement, wherein both a PWM pulse train input and the desired direction of current flow (current command direction) are both utilized to operate the switching devices. In the case where the current command direction is positive, the PWM pulse train input is directly applied to control the upper switching device, while the lower switching device is kept open at least during the closing time of the upper switching device. In the case where the current command direction is negative, the PWM pulse train input is first inverted, and then applied to the lower switching device, while the upper switching device is kept open at least during the closing time of the lower switching device.

In accordance with the present invention, a precise average PWM output voltage can be obtained, independent of the Dead Time delay, so that a large Dead Time can be used, to provide a precise voltage output over the fill range of the DC power supply, while maintaining high reliability.

The inventive method can be implemented using a microprocessor-based control system, for control of the switching devices, for better integration in a digital system.

Other features and advantages of the invention will become apparent from the following drawings and description.

BRIEF DESCRIPTION OF THE DRAWINGS

For a better understanding of the invention, reference is made to the accompanying drawings, in which like numerals designate corresponding elements or sections throughout, and in which.

DETAILED DESCRIPTION OF THE PREFERRED EMBODIMENTS

Figure 1:
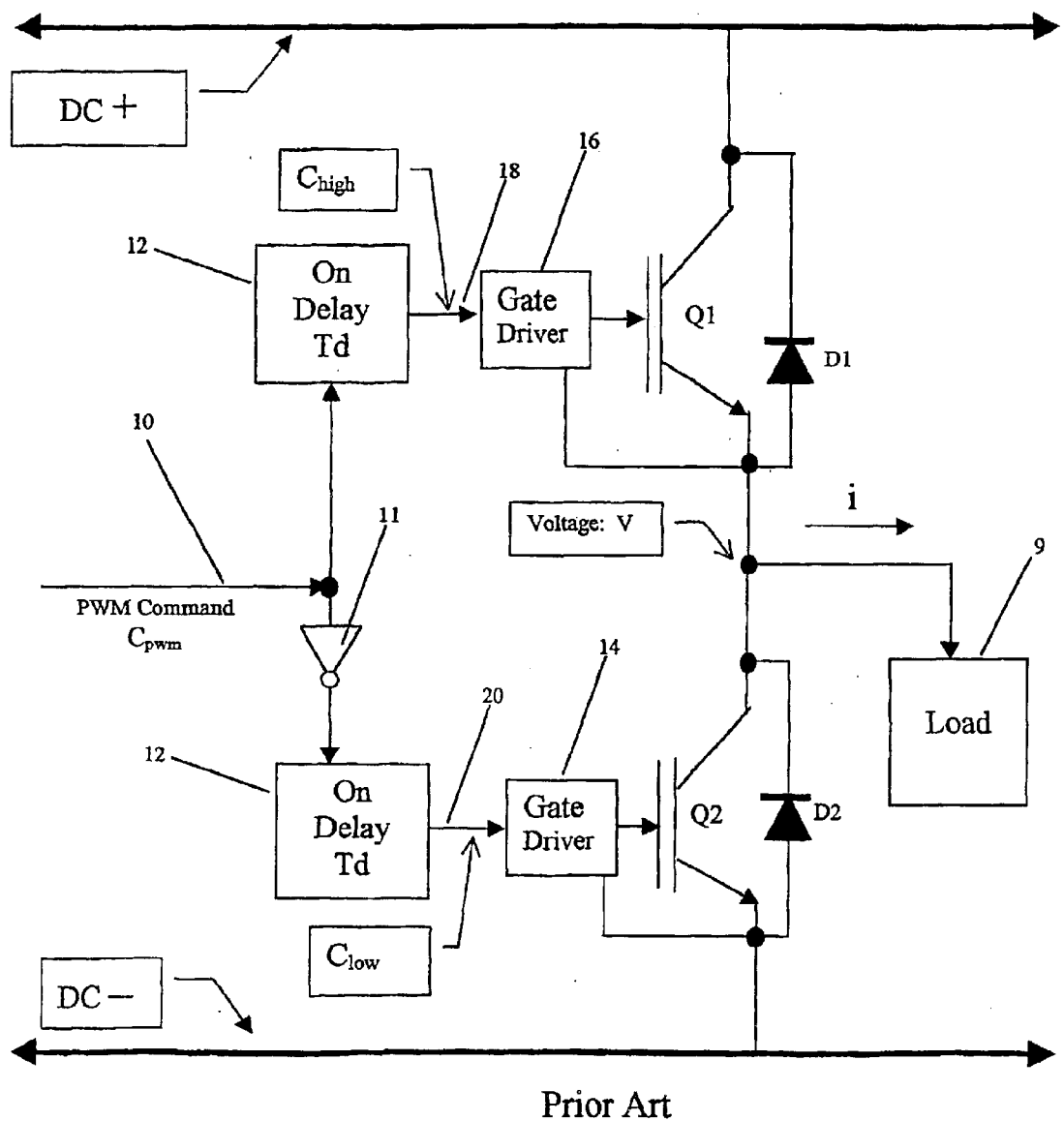
FIG. 1 shows a prior art PWM control system, to apply a PWM voltage to one side of a load connection.

A typical system of the prior art is shown in FIG. 1. The two switching devices are shown here as two transistors, Q1 (upper) and Q2 (lower). Transistor Q1 is connected on one leg to the positive pole of the DC power supply, with the other leg connected to the load. Transistor Q2 is connected on one leg to the negative pole of the DC power supply, and on the other leg to the load 9, where transistor Q1 is connected. Each transistor functions as a switch for current flowing from the upper leg to the lower leg. The transistor can be operated in a conducting state (ON) representing a closed switch, or it can be operated in a non-conducting state (OFF), representing an open switch. Connected, respectively, in parallel to each transistor are diodes D1 and D2 which conduct current in the opposite direction. This arrangement is further referred to herein as a half-bridge arrangement.

A Voltage Command is applied to the system, and may be implemented in the form of an input signal waveform having two logical states, ON and OFF. In FIG. 1, this Voltage Command is applied in the form of a PWM pulse train. This pulse train (see FIG. 2) is a pulse with Tpwm on-time and Tcycle period, representing:

Voltage Command value=$Vc=E*Tpwm/Tcycle$.

This pulse train is transferred to the gate of the power switches through a delay circuit 12. When the pulse train goes ON, then lower transistor Q2 is immediately switched OFF by Gate Driver 14, and the upper transistor Q1 is switched ON by Gate Driver 16 after a Dead Time delay (Td).

When the pulse train goes from ON to OFF, then the upper transistor Q1 is immediately switched OFF, while lower transistor Q2 is switched ON after a Dead Time delay.

Figure 2:
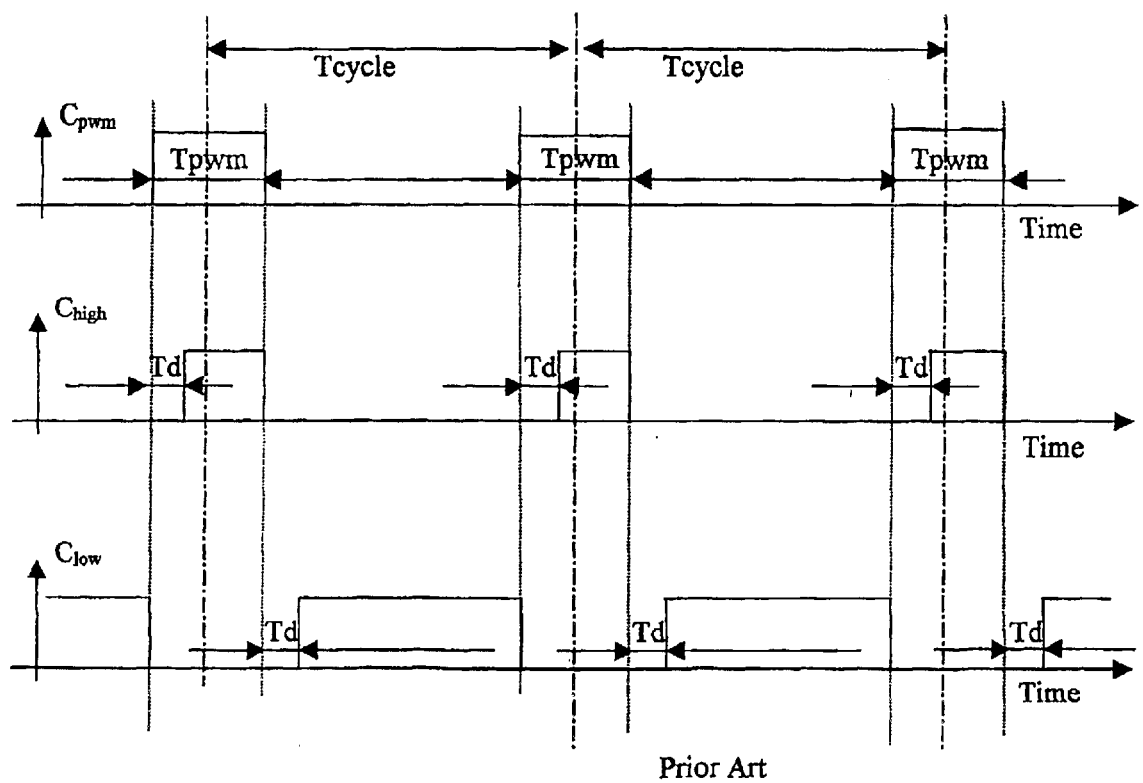
FIG. 2 shows a timing chart for such a prior art system.

The timing chart for the gate signals $C_{high}$ (18) and $C_{low}$ (20) to transistors Q1–Q2 is shown in FIG. 2.

Ideally, if the dead time delay (Td) were infinitely small, then the average voltage (V) obtained on the load would be (where E represents the DC power supply voltage):

V=E*Tpwm/Tcycle, which is the ideal case where the average voltage output is directly proportional to the Voltage Command value.

However, if the dead time delay has a non-zero value, as in a practical case, then the average voltage has a different value. Upper transistor Q1 will conduct for a period of Tpwm−Td. Lower transistor Q2 will not conduct during a period Tpwm+Td. So, before and after the conducting time of upper transistor Q1, there will be a delay period during which no transistor will conduct (Dead Time delay).

The time continuity of the current flow implies that during the Dead Time delay, the Voltage will be equal to that of the Positive pole of the power supply (+E) if the current is negative (flowing from load to transistors). This is because current will flow through the upper diode D1 to that pole. Symmetrically, if the current is positive, the voltage will be equal to that of the negative pole of the power supply (0 Volts), since current will flow through diode D2.

Taking into account these Dead Time delays, the average voltage applied to the load during one cycle will be:

If current is positive:

$V=E*[Tpwm-Td]/Tcycle$

If current is negative:

$V=E*[*Tpwm+Td]/Tcycle$

Some compensation methods have been proposed in the prior art (e.g., in the paper "Pulse Based Dead Time Compensator for PWM Voltage Inverter, David Leggate, IEEE Transactions on IE, Vol. 44, No. 2, 1997). These compensation methods add or subtract the Dead Time delay to or from the Tpwm value command, adding if the current is positive, subtracting if negative. These methods can compensate for the imprecision of the PWM voltage output, however they cannot be used when PWM voltage command is close to the voltage of one of the power supply poles, either 0 volts or E volts.

For example, with a negative current in order to output the small voltage value

V=(E*Td/Tcycle)/2, without compensation, and the output value would be Tpwm=Td/2. As shown before, this will result in voltage V=E*[Td/2+Td]/Tcycle, which is three times larger than the desired value.

If prior art compensation methods are used, the value Td is subtracted from the Tpwm command, and a negative value (−Td/2) is obtained for Tpwm, meaning that the switches will not be activated in that cycle, thus the PWM average value obtained will be V=0, for that cycle.

So both systems, with or without compensation, produce an imprecision in PWM voltage output.

Figure 3:
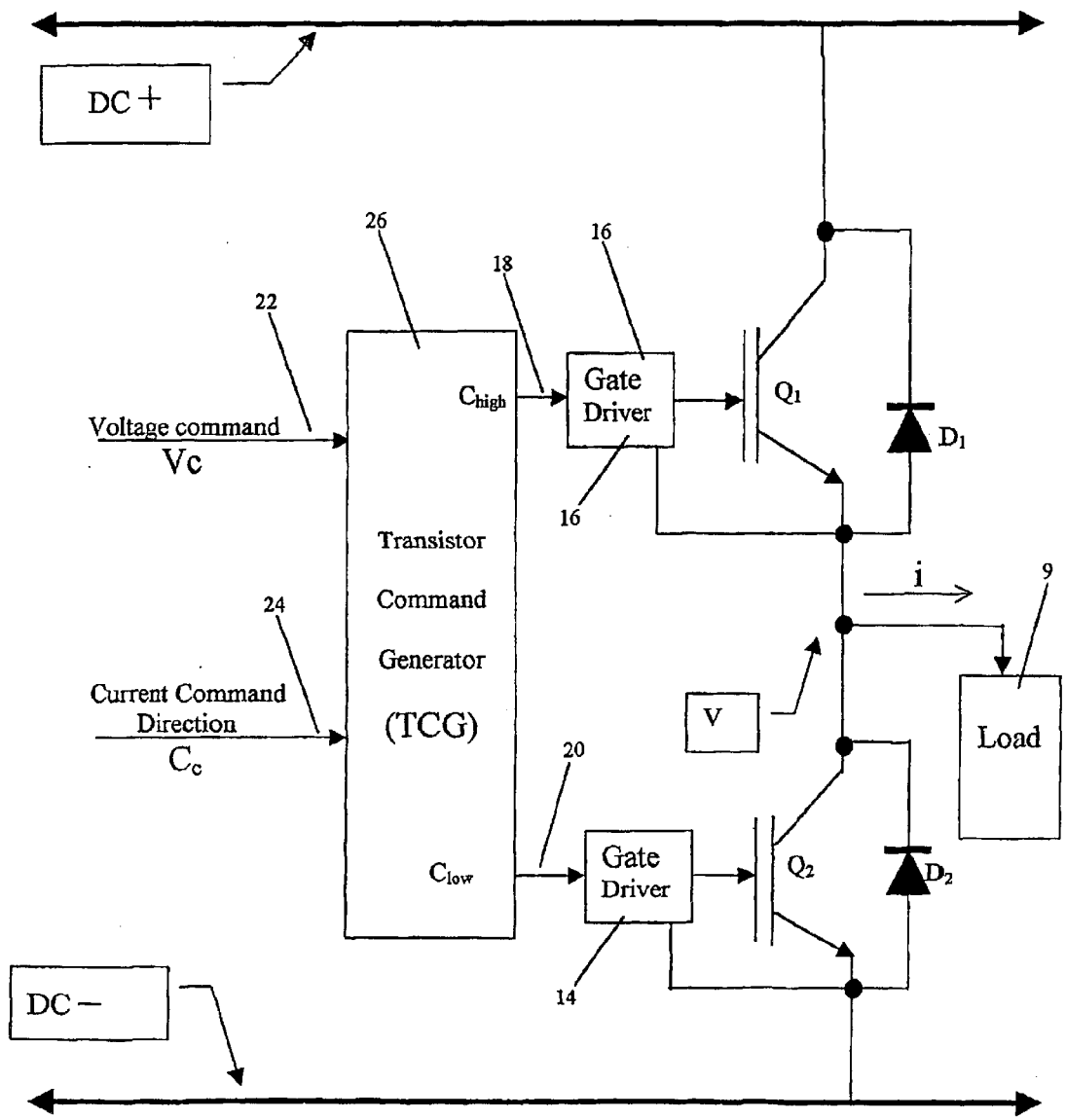
FIG. 3 shows a general block diagram of the inventive PWM control system.

Referring now to FIG. 3, there is shown a general block diagram of the inventive PWM system.

In most modern control systems, the current in the load is controlled, and the PWM voltage is the means used to control that current. As a consequence, the Current Command value is defined. Typically, the control system will set the PWM voltage in order to produce a change in the current value, according to the present needs of the control system. For example, in a servo control system for a motor, the velocity is controlled; in that system a speed sensor is used to measure the actual speed of a motor. If the speed is different from a presently desired speed (Command Speed), then the servo system will change the current command to a new value, in order to modify the torque developed on the motor, and thus correct the speed.

Another inner control loop (current control loop) of the servo amplifier will check the difference between the actual current flowing in the motor and the current command. If a difference is found, then the current control loop will change the PWM command, in order to change the average voltage applied to the motor, resulting in a new current with a value closer to the command value.

As a result, in most modern control systems, both the PWM Voltage Command and Current Command are defined. In particular, the Current Command direction is known.

Based on this consideration, the inventive method uses both Voltage Command (Vc) and Current Command (Cc) direction as input signals 22 and 24, as shown in FIG. 3.

The Voltage Command Vc and the Current Command direction Cc are input to a Transistor Command Generator (TCG) 26. The TCG 26 functions as a switching controller for the switching devices Q1 and Q2, so as to precisely control the switching intervals, in order to apply an exact PWM voltage (V) to the load, without being influenced by the Dead Time delay.

The TCG 26 creates two different gate signals 18 and 20 ($C_{high}$ and $C_{low}$) which are fed to Gate Drivers 16 and 14, respectively, for upper and lower transistors Q1 and Q2.

In a first step, the Voltage Command (Vc) signal 22 is interpreted as a PWM pulse train of width Tpwm and period Tcycle. The pulse width Tpwm is calculated so that for the DC power supply E and for an ideal system without Dead Time delay, the pulse width Tpwm would exactly result in an average output voltage value matching that of the Voltage command, Vc, in accordance with the equation:

$$Tpwm=Tcycle*Vc/E$$

This PWM pulse train is an interior variable or signal of the TCG 26 implemented in hardware or software, so that it does not need to actually be output.

Figure 4:
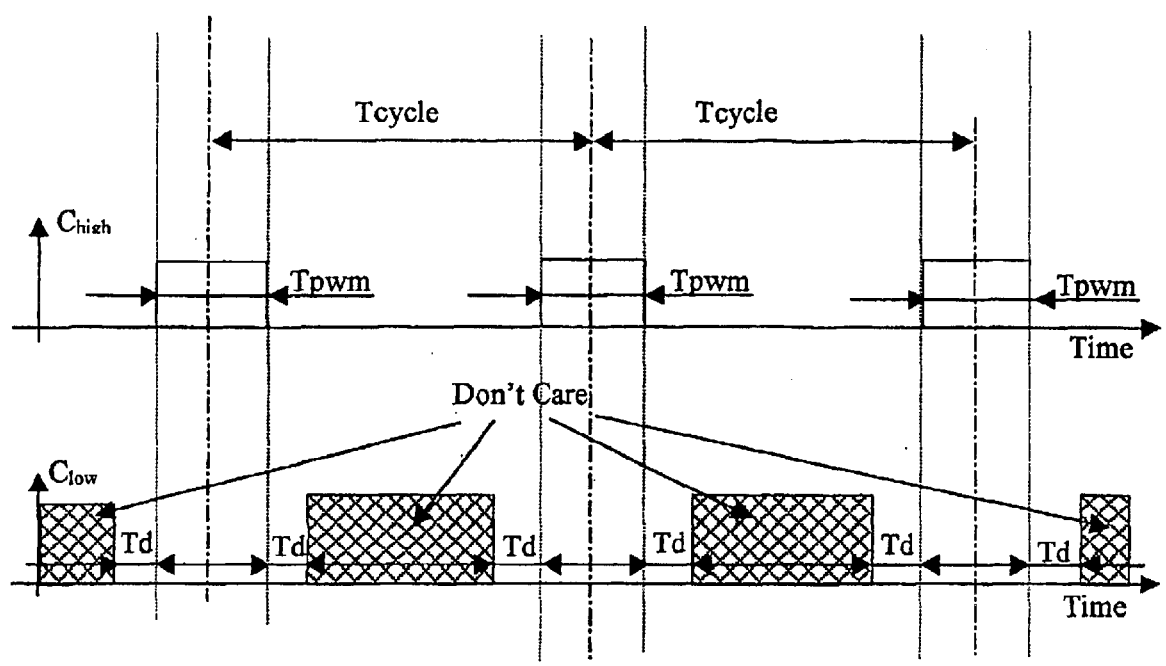
FIG. 4 shows a timing chart for the inventive system in the case of a positive current command.
Figure 5:
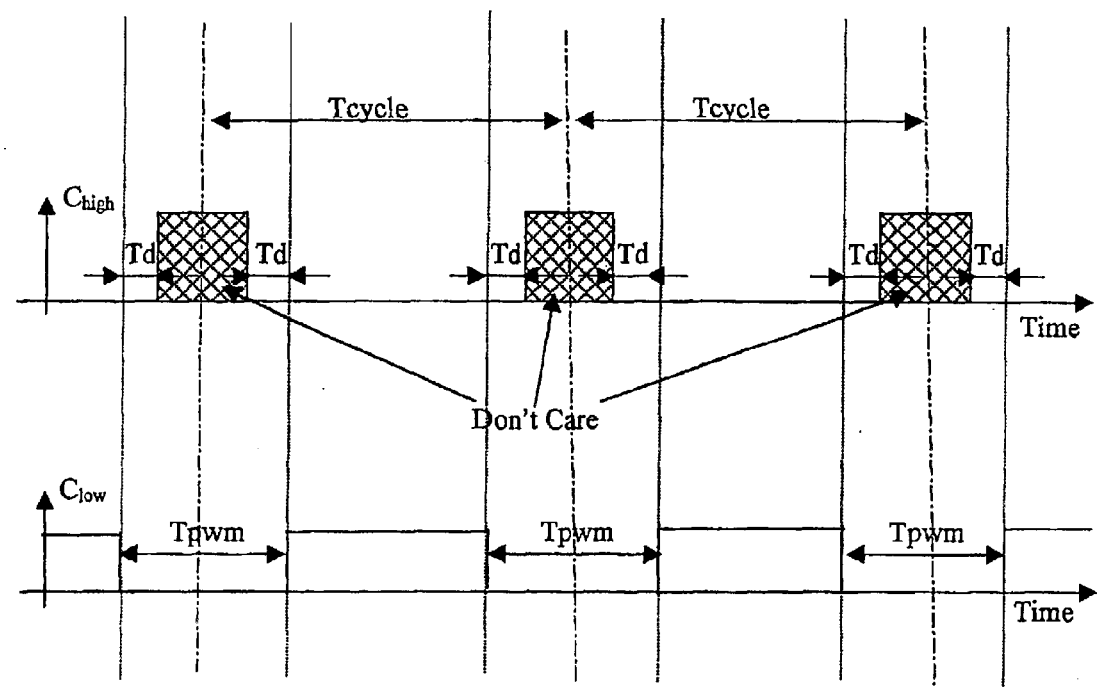
FIG. 5 shows a timing chart for the inventive system in the case of a negative current command.

Then the TCG generates the two transistor command signals 18 and 20 ($C_{high}$ and $C_{low}$) according to the following charts, as shown in FIGS. 4 and 5:

a) In the case where the Current Command direction is positive (FIG. 4):
The upper transistor command signal ($C_{high}$) is identical to the PWM pulse train, i.e. the transistor Q1 is set conducting (ON) for Tpwm time, at each Cycle of the PWM, and not conducting otherwise.

The lower transistor command signal ($C_{low}$) maintains Q2 not conducting (OFF) for Td Dead Time before Q1 is switched ON, all the time while Q1 is ON, and for Td Dead Time after Q1 is ON. The state of Q2 is unimportant in other portions of the cycle, and is preferably OFF.

b) In the case where the Current Command direction is negative (FIG. 5):
The lower transistor Q2 is kept not conducting (OFM) for Tpwm time during each PWM cycle, and conducting (ON) otherwise.
The upper transistor command signal ($C_{high}$) maintains Q1 not conducting for Td Dead time before Q2 is switched ON, all the time while Q2 is ON, and for Td Dead time after Q2 has been switched OFF. The state of Q1 is unimportant in other portions of the cycle, and is preferably OFF.

The purpose of the inventive system is to apply to the load an average voltage value equal to the Voltage Command. Another purpose is also to maintain the real current equal to the Command Current. As will be shown here, an additional benefit of the inventive system is that in the case where the real current has opposite direction to the Command Current, then the PWM pattern of this invention will force the real current to reverse direction, in-line with the command direction, at the maximum possible speed of the system, which is defined by the DC bus voltage and the load.

In a first case, in which the Current Command direction is Positive and the Real Current direction is positive, while Q1 is switched ON, the load 9 is directly connected to the positive pole of the power supply, and the voltage applied to the load 9 is equal to that of the Power Supply (E) positive voltage.

During the time where Q1 is switched OFF, the Real Current is positive, and the necessary continuity of current will force the current to flow toward the load 9. Since the path through Q1 is not available, then current will flow through diode D2, and the voltage applied to the load 9 will be that of the negative pole of the power supply. It is remarkable that this situation is not dependent on the state of Q2. As a result, the voltage applied to the load during the OFF phase of the upper transistor will be always zero (i.e. at the potential of the negative pole of the power supply).

Thus, in the case where both Real Current and Current Command are Positive, the load will be brought to a voltage E for Tpwm time and to voltage zero for Tcycle−Tpwm time. As a result, the average output voltage will be $$V=E*Tpwm/Tcycle=Vc$$

In a second case, in which the Current Command direction is positive, and the real Current direction is negative, while Q1 is switched ON, the load 9 is directly connected to the positive pole of the power supply, and the voltage applied to the load 9 is equal to that of the Power Supply (E) positive voltage.

During the OFF time of Q1, current will flow through diode D1 in order to maintain continuity. In that case, the voltage will be equal to the Power Supply voltage. As a result, as long as Real Current is negative, then the system will directly apply the power supply to the load, thus causing the Real Current to rapidly decrease in absolute value, until it reaches zero or negative value. In that case, the average voltage will be equal to the value of the power supply voltage, which is desirable in order to return the Real Current direction to the Current Command direction.

In a third case, in which the Current Command direction is negative and the Real Current direction is also negative, while the lower transistor Q2 is switched ON, then zero voltage is applied to the load, since Q2 directly connects the load to the negative pole of the power supply. While the lower transistor Q2 is switched off, the Real Current is flowing from the load 9 to the system, then the current continuity will cause the current to flow through the diode D1, and thus the voltage applied to load 9 will be the Power Supply voltage (E). It is remarkable that the voltage applied to the load 9 is not dependent on the state of the upper transistor Q1.

Thus, in the case where both Real Current and Current Command are negative, the load will be brought to a voltage E for Tpwm time and to voltage zero for Tcycle–Tpwm time. As a result, the average output voltage will be $$V = E * Tpwm/Tcycle = Vc$$

In a fourth case, in which the Current Command direction is negative but the Real Current direction is positive, while the lower transistor Q2 is switched ON, then zero voltage is applied to the load, since Q2 directly connects the load 9 to the negative pole of the power supply. When the lower transistor Q2 is switched OFF, then the continuity of current will force it through the diode D2, and thus the voltage applied to load 9 will be zero.

As a result, as long as Real Current is positive, then the system will directly apply a zero voltage to the load, thus causing the Real Current to rapidly decrease in absolute value, until it reaches zero or negative value. In that case, the average voltage will be equal to a zero voltage, which is desirable in order to return the Real Current direction to the Current Command direction.

Resuming all cases, if the Current Command and Real Current have the same direction, then the Average Output Voltage is exactly equal to the Voltage command.

If the Current Command and Real Current have opposite directions, then the system sets the maximum voltage possible in the appropriate direction, that will return the real current in the direction of the command.

The system thus allows the control of the Load Voltage, with an additional benefit for the Current Control. Most modern systems aim to control the load current as a first priority and the voltage as a second priority. A system designed according to this invention will improve the precision of the control of both the Voltage and Current output.

Figure 6:
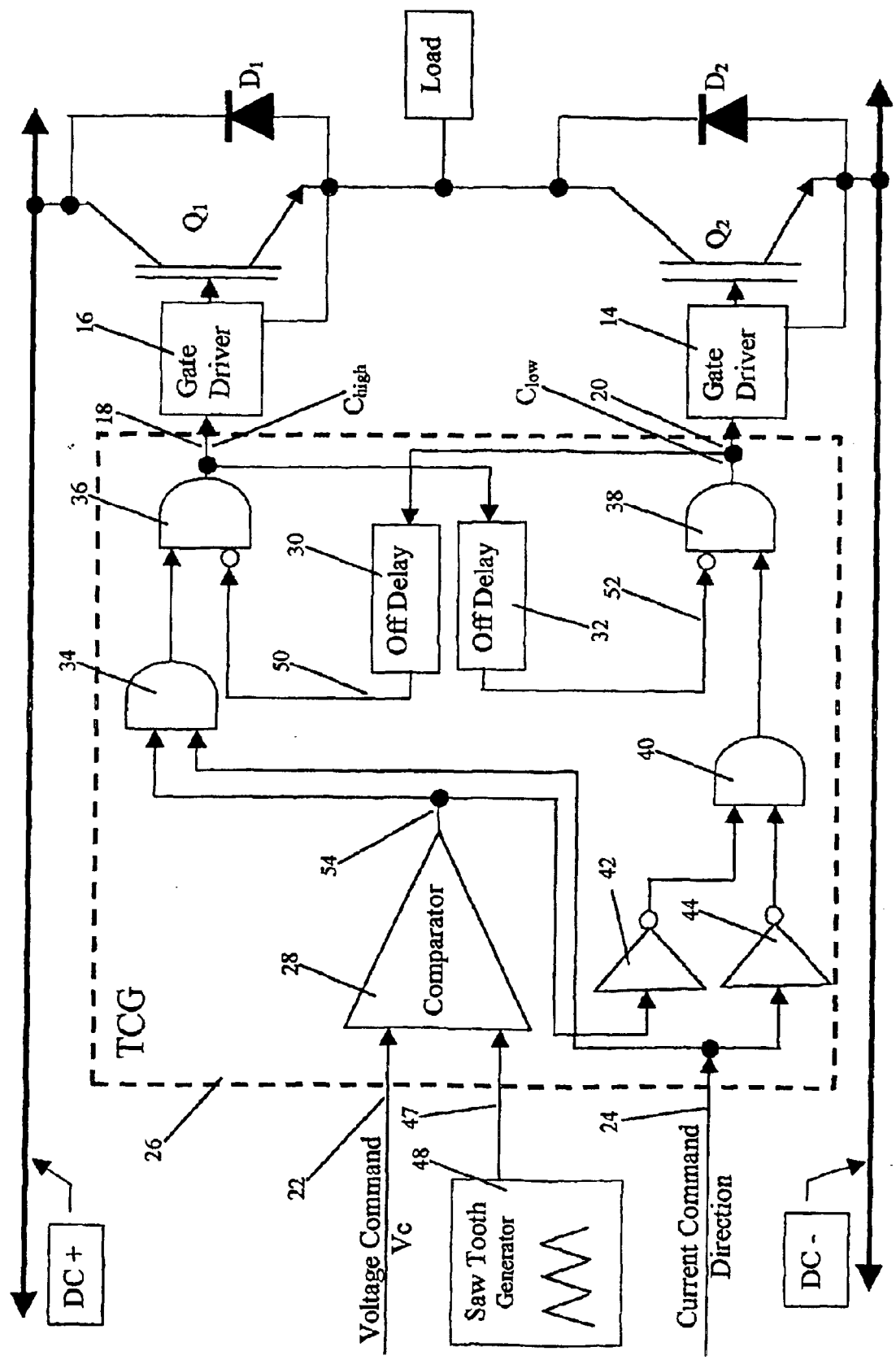
FIG. 6 shows a hardware embodiment for generating the inventive PWM pattern.

In FIG. 6, there is shown a preferred embodiment for implementation of the TCG 26. TCG 26 comprises a comparator 28, a pair of OFF delay circuits 30, 32, and logic gates 34, 36, 38, 40, 42, and 44.

A voltage command signal 22 (Vc), and saw tooth (St) signal 47 from a saw tooth signal generator 48, are input to comparator 28. If the voltage command signal 22 exceeds the saw tooth signal 47, then the output signal 54 of the comparator is a logic level 1. Otherwise the comparator output signal 54 is a zero logic level. This technique is a standard one for generating a PWM signal (see Vithayathil reference in Background). The output signal 54 of comparator 28 is now a pulse. The ON time of that pulse is in linear relation with the value of the voltage command signal 22 (Vc). The ON time of the pulse is represented herein by Tpwm, and Tcycle represents the period of the saw tooth signal.

The voltage command signal 22, the saw tooth signal 47 and comparator 28 may be analog or digital signals or devices. If digital then voltage command (Vc) signal 22 and saw tooth signal 47 will be held in registers (in a programmable logic device for example), and the comparator 28 will be a digital comparator. In the case of analog devices, voltage command and saw tooth signals will be the electrical level of the respective input lines. In all cases, comparator 28 will have a digital signal output, i.e. with only two values.

A Current Command direction signal 24 is also input to the TCG 26, in the form of a logic signal. In the preferred embodiment, the logic level is set to 1 if the current is positive.

Each of the pair of OFF delay circuits 30, 32 generates a respective output signal 50, 52 that has logic level 1 when its input has logic level 1, but when its input logic level returns to zero, its output signal 50, 52 returns to a logic level 0 only after a time delay Td. These delayed output signals 50, 52 are input at the inverting inputs of respective AND gates 36 and 38. By its operation, OFF Delay circuits 30, 32 together with AND gates 36, 38 provide protection against simultaneous conduction of transistors Q1–Q2.

Both Current Command direction signal 24 and output signal 54 of comparator 28 are input to an AND logic gate 34. The result is that the output signal 54 of comparator 28 passes through AND gates 34 and 36 only if Current Command direction signal 24 is positive, and the OFF delay circuit output 30 is inverted to logical 1 (from logic 0). This occurs only when a sufficient time interval has elapsed since the prior ON operation of Q2.

If this is the case, the activating gate signal $C_{high}$ is transmitted to Gate Driver 16 in order to switch on transistor Q1. If however, the elapsed time since the last OFF switching operation of lower transistor Q2 is shorter than a safe Dead Time delay Td, then AND gate 36 blocks transmission of the comparator 28 output signal 54, so that Gate Driver 16 does not switch transistor Q1 ON.

Normally, if the Current Command direction signal 24 is positive, and sufficient time has elapsed since the switching OFF of transistor Q2, then transistor Q1 will be switched ON for a time interval of Tpwm, and switched OFF during the rest of the cycle.

In the case that the Current Command direction signal 24 is negative, the AND gate 34 has a zero logic output, and transistor Q1 is never switched ON.

In symmetrical fashion, the switching operation of transistor Q2 is controlled by AND logic gates 38, 40. However, AND gate 40 receives the inverted output of the comparator 28 output signal 54 via inverter 42, and the inverted Current Command direction signal 24 via inverter 44.

Normally, if the Current Command direction signal 24 is negative, then transistor Q2 will be switched OFF for a time interval of Tpwm, and switched ON during the rest of the cycle, if sufficient time has elapsed since the switching OFF of transistor Q1.

In the case that the Current Command direction signal 24 is positive, the AND gate 40 has a zero logic output, and transistor Q2 is never switched ON.

Figure 7:
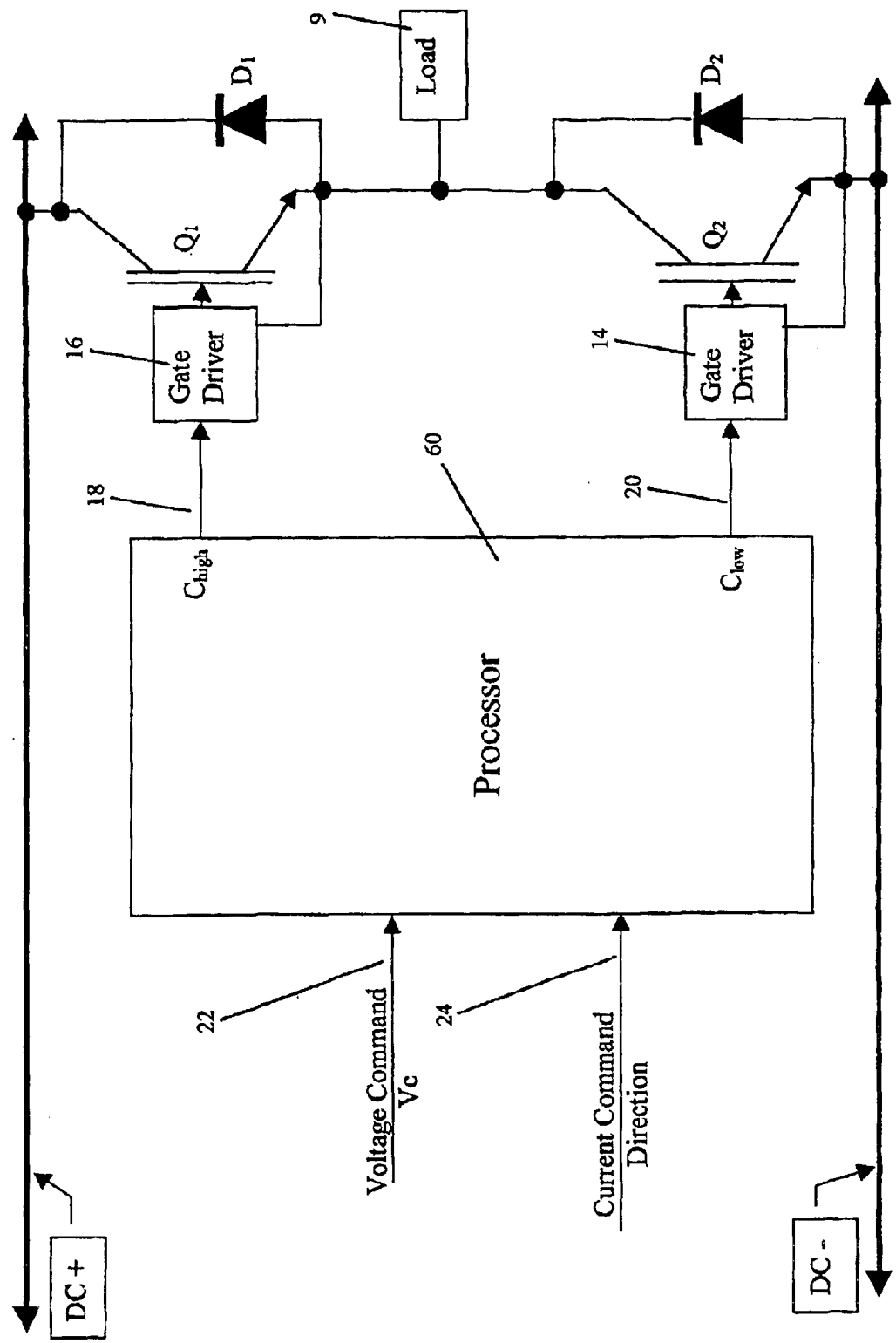
FIG. 7 shows an alternative embodiment using a microprocessor.

In FIG. 7, there is shown an implementation of the TCG 26 using a microprocessor 60. Microprocessor 60 enables control of switching signals used to control the ON time and OFF time of switching devices Q1 and Q2. In this fashion, a PWM switching pattern can be produced according to the method of the invention.

Figure 8:
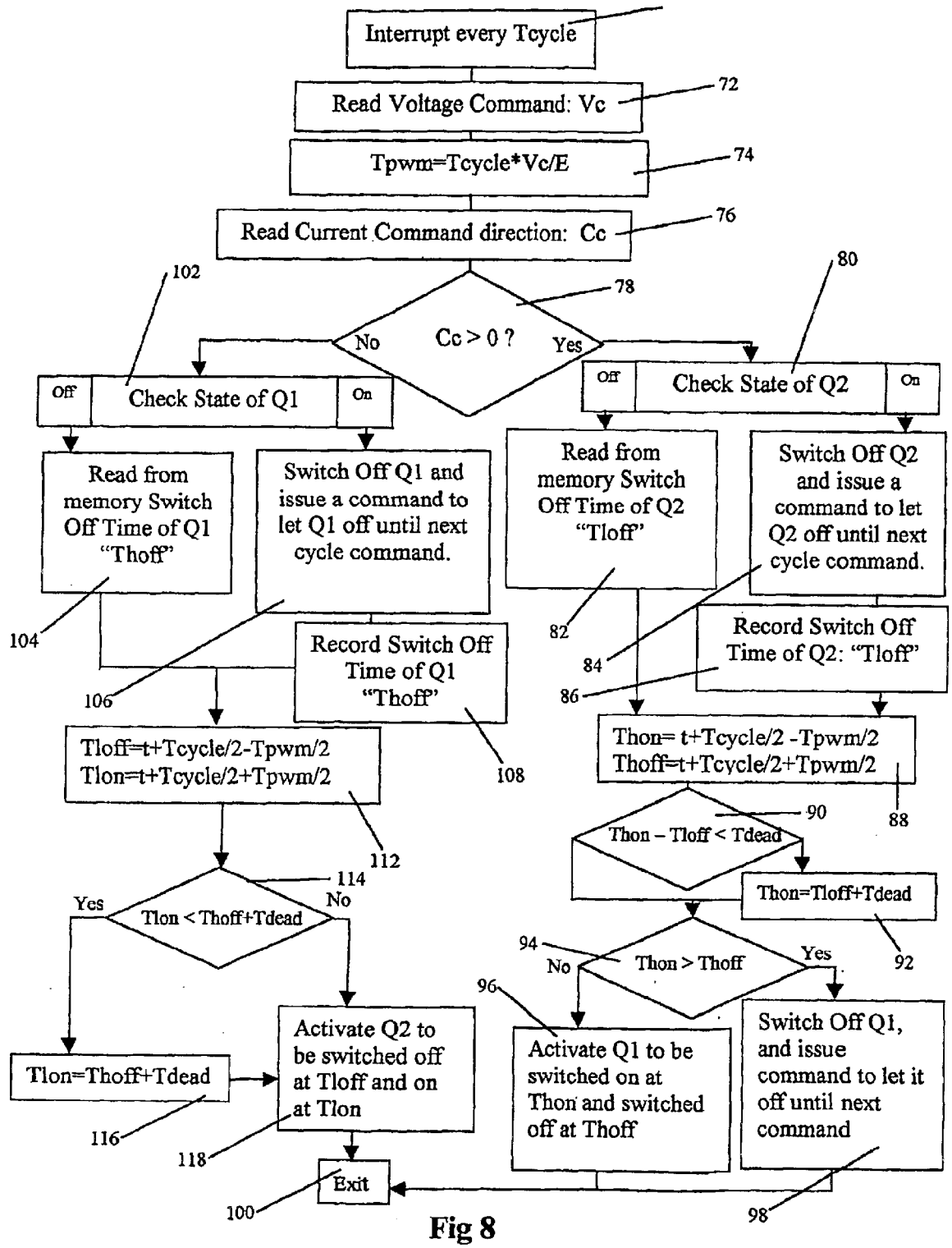
FIG. 8 shows an example of a software flowchart used in the embodiment of FIG. 7 to generate the inventive PWM pattern.

FIG. 8 shows a possible flow chart for a microprocessor program, that will create a PWM pattern according to the invention.

In block 70, the system initiates a new PWM cycle, and in block 72, the Voltage Command Vc is received. The PWM pulse width Tpwm is calculated in block 74, and the Current Command direction is received in block 76. In decision block 78, if the Current Command direction is positive, the operation continues in block 80, where the state of transistor Q2 is checked. If Q2 is OFF, in block 82, the delay from the last switch off time is recorded and represented as "Tloff". If transistor Q2 was in the ON state, in block 84 a command is generated to switch transistor Q2 OFF for the remaining time of the present cycle, and the switch OFF time of transistor Q2 is recorded in block 86 and represented as "Tloff". In block 88, following either of blocks 82 or 86, the switching ON and OFF times of transistor Q1 are calculated, and represented as "Thon" and "Thoff".

In block 90, the OFF time of transistor Q2 is checked, to see if the time remaining until the switching ON of transistor Q1 is greater than the Dead Time delay Td. If it is not greater, then in block 92 the switching ON time of transistor Q1 is recalculated in order to comply with the Dead Time delay Td. Following block 90 or 92, in block 94 the calculated switching ON time of transistor Q1 is checked to see if it is prior to the calculated switching OFF time of transistor Q1, as calculated in block 88.

If this condition is verified, then a command is generated in block 96 to switch ON transistor Q1 at time "Thon", and to switch it OFF at time "Thoff". If this condition is not verified, then in block 98, a command is generated to keep transistor Q1 OFF during the remaining time of the cycle.

In block 100, the software routine is completed, and will be re-activated at the beginning of the next PWM cycle.

Returning to decision block 78, in the case where the Current Command direction is negative, then symmetric operation of the system commences with block 102, and all of the remaining steps are performed, by replacing transistor Q2 by Q1, and interchanging for Q2 the ON state and OFF state when performing the step described.

Having described the invention with regard to certain specific embodiments thereof, it is to be understood that the description is not meant as a limitation, since further modifications may now suggest themselves to those skilled in the art, and it is intended to cover such modifications as fill within the scope of the appended claims.

What is claimed is:

1. A system for producing an output voltage for supplying current to a load, by controlling the switching of a pair of electronic switches in order to eliminate the influence of dead time between switching them, the pair of electronic switches being connectable in a half-bridge arrangement across power supply terminals, with the first switch being connected to a positive power supply terminal, wherein a positive current flow direction is defined with respect to the load, when current flows to the load, said system comprising:

first means operable to close and open the first switch of the electronic switch pair in response, respectively, to the ON and OFF times of an input signal waveform;

second means operable to open and close the second switch of the electronic switch pair in response, respectively, to the ON and OFF times of said input signal waveform within a cycle thereof;

such that in the case where a positive current command is provided to establish a positive current, said first means closes the first switch during the ON time of said input signal waveform, and opens it during the OFF time thereof, while said second means operates to open the second switch at least during the closing time of the first switch, and in the case where a negative current command is provided to establish a negative current, said second means opens said second switch during the ON time of said input signal waveform, and closes it during the OFF time thereof, while said first means operates to open the first switch at least during the closing time of the second switch, the first and second electronic switches operating such that the average output voltage will be precisely in accordance with the average width of said input signal waveform.

2. The system of claim 1 wherein said first and second means comprises a controller operating:

to close the first switch during the ON time of said input signal waveform, if a predetermined period has elapsed during which the second switch was opened, and to open the first switch during the OFF time of said input signal waveform; and to close the second switch during the OFF time of said input signal waveform, if a predetermined period has elapsed during which the first switch was opened, and to open the second switch during the ON time of said input signal waveform.

3. The system of claim 2 wherein said input signal waveform is produced by a comparator which compares a reference voltage and a sawtooth voltage wave pattern.

4. The system of claim 2 wherein said controller is implemented by electronic logic gates.

5. The system of claim 1 wherein said input signal waveform is calculated by a microprocessor executing a software control program.

6. The system of claim 2 wherein said controller is implemented by a microprocessor executing a software control program.

7. The system of claim 1 wherein said second means operates to open the second switch whenever a positive current command is provided.

8. The system of claim 1 wherein said first means operates to open the first switch whenever a negative current command is provided.

9. A method for producing an output voltage for supplying current to a load, by controlling the switching of a pair of electronic switches in order to eliminate the influence of dead time between switching them, the pair of electronic switches being connectable in a half-bridge arrangement across power supply terminals, with the first switch being connected to a positive power supply terminal, wherein a positive current flow direction is defined with respect to the load, when current flows to the load, said method comprising:

operating the first switch of the electronic switch pair in closed and open states in response, respectively, to the ON and OFF times of an input signal waveform, operating the second switch of the electronic switch pair in open arid closed states in response, respectively, to the ON and OFF times of said input signal waveform, such that in the case where a positive current command is provided to establish a positive current, said first switch is closed during the ON time of said input signal waveform, and is opened during the OFF time thereof, while said second switch is opened at least during the closing time of said first switch, and in the case where a negative current command is provided to establish a negative current, said second switch is opened during the ON time of said input signal waveform, and is closed during the OFF time thereof; while said first switch is opened at least during the closing time of said second switch, said first and second electronic switches operating such that the average output voltage will be precisely in accordance with the average width of said input signal waveform.

10. The method of claim 9 wherein said first and second switches operate:
   to close the first switch during the ON time of said input signal waveform, if a predetermined period has elapsed during which the second switch was opened, and to open the first switch during the OFF time of said input signal waveform; and
   to close the second switch during the OFF time of said input signal waveform, if a predetermined period has elapsed during which the first switch was opened, and to open the second switch during the ON time of said input signal waveform.

11. The method of claim 9 wherein said closing and opening operations are controlled by a microprocessor executing a software control program.

12. The method of claim 9 wherein said closing and opening operations are controlled by logic gates.

13. The method of claim 9 wherein said input signal waveform is calculated by a microprocessor executing a software control program.

14. The method of claim 1 wherein said second means operates to open the second switch whenever a positive current command is provided.

15. The method of claim 1 wherein said first means operates to open the first switch whenever a negative current command is provided.

* * * * *